June 29, 1937.  T. TOMOZAWA  2,085,400
METHOD AND APPARATUS FOR REPRODUCING SCULPTURED OBJECTS
Filed June 13, 1935  3 Sheets-Sheet 1
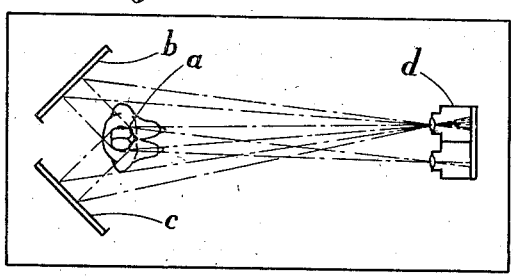
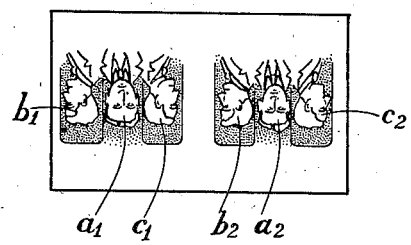
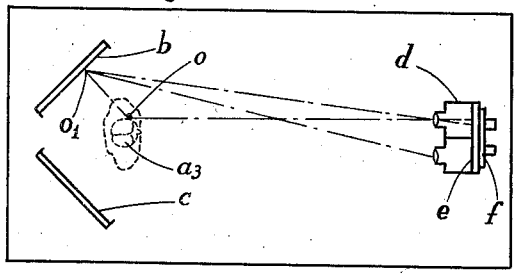
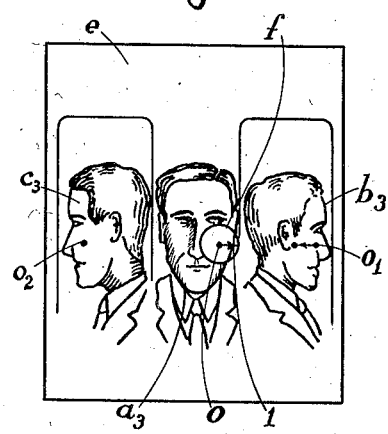
INVENTOR
Takashi Tomozawa
BY
ATTORNEY June 29, 1937.  T. TOMOZAWA  2,085,400

METHOD AND APPARATUS FOR REPRODUCING SCULPTURED OBJECTS

Filed June 13, 1935  3 Sheets-Sheet 2

INVENTOR
Takashi Tomozawa
BY
ATTORNEY

June 29, 1937.  T. TOMOZAWA  2,085,400
METHOD AND APPARATUS FOR REPRODUCING SCULPTURED OBJECTS
Filed June 13, 1935   3 Sheets-Sheet 3
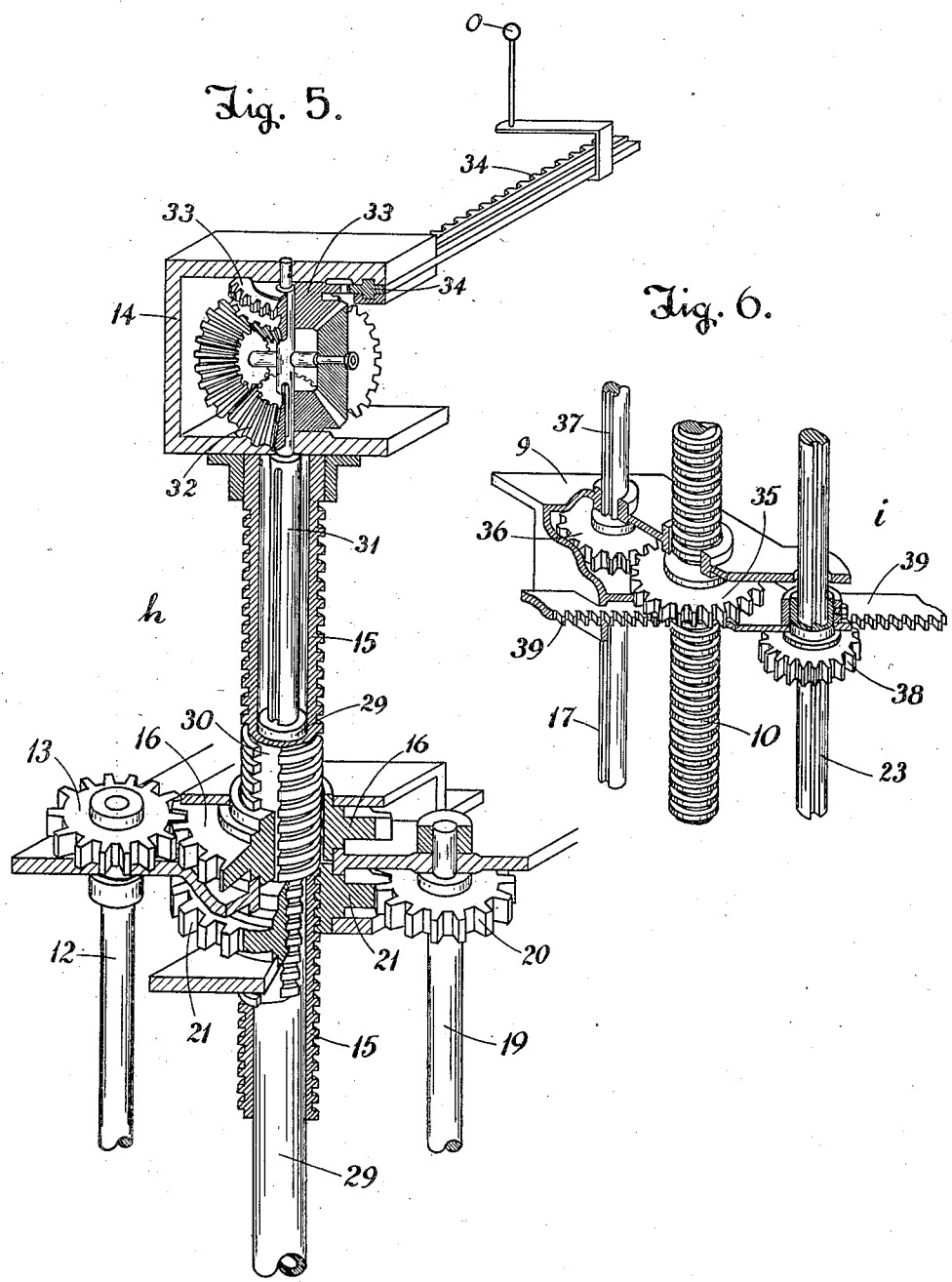
INVENTOR
Takashi Tomozawa
BY
Francis E. Bayer
ATTORNEY Patented June 29, 1937

2,085,400

UNITED STATES PATENT OFFICE 2,085,400

METHOD AND APPARATUS FOR REPRODUCING SCULPTURED OBJECTS

Takashi Tomozawa, Yotsuya-ku, Tokyo, Japan, assignor to Nippon Kogaku Kogyo Kabushiki Kaisha, Tokyo, Japan, a corporation of Japan Application June 13, 1935, Serial No. 26,391
In Japan August 7, 1934

9 Claims. (Cl. 41—25)

This invention relates to a method and apparatus for reproducing objects by sculpture.

One important object of the invention is to provide a novel apparatus utilizing stereoscopic pictures of an object for determining accurately the proper positioning of a sculpturing tool arranged to act upon a block of molding material such as clay or the like.

A second important object of the invention is to provide a novel apparatus for this purpose by which stereoscopic photographs of an object may be taken, developed and used for the determination of the positions of a sculpturing tool either in themselves or by positive transparencies printed from them.

A third important object of the invention is to produce a novel method of sculpture involving the observation of stereoscopic photographs taken at several angles to a body to be reproduced and the determination of sculpturing points on a mass of sculpturing material from such observations.

The present invention simplifies the complicated known method of having to photograph the entire periphery of an object and proposes a method of making a statue easily and mechanically correct, by taking an instantaneous photograph, two mirrors being utilized to produce simultaneously, ou a single plate, stereoscopic photographic negatives of an object viewed from the front and from points to the rear and sides at about 180° to the front view. The plate is developed and a positive transparency is printed therefrom and developed, the transparency being then placed in plate position in the camera and observed through a binocular stereoscope. At the same time an indicator point is positioned in place of the object which has been removed after photographing it. This indicator point has its image projected on the transparency by the stereoscopic camera and is stereoscopically observed at the same time transparency is observed. From these observations a sculpturing tool is manually positioned to act on a mass of clay.

Referring to the accompanying drawings,

Fig. 1 is a diagrammatic plan view showing the apparatus as arranged for taking stereoscopic photographs of an object.

Fig. 1a is a face view of a plate having a set of stereoscopic photographs thereon, the photographs being taken with the apparatus arranged as in Fig. 1.

Fig. 2 is a view similar to Fig. 1 but showing the apparatus arranged for performing the sculpturing operations.

Fig. 2a is a photographic transparency printed from the plate shown in Fig. 1a as it appears when stereoscopically viewed from different positions centrally of the pairs of stereoscopic photographs thereon.

Fig. 5 is a fragmentary perspective view of certain parts of the apparatus at the indicator used herein.

Fig. 6 is a fragmentary perspective view of certain parts arranged for the manual control of the sculpturing tool.

In the drawings, the same reference characters denote the same parts.

Figure 3:
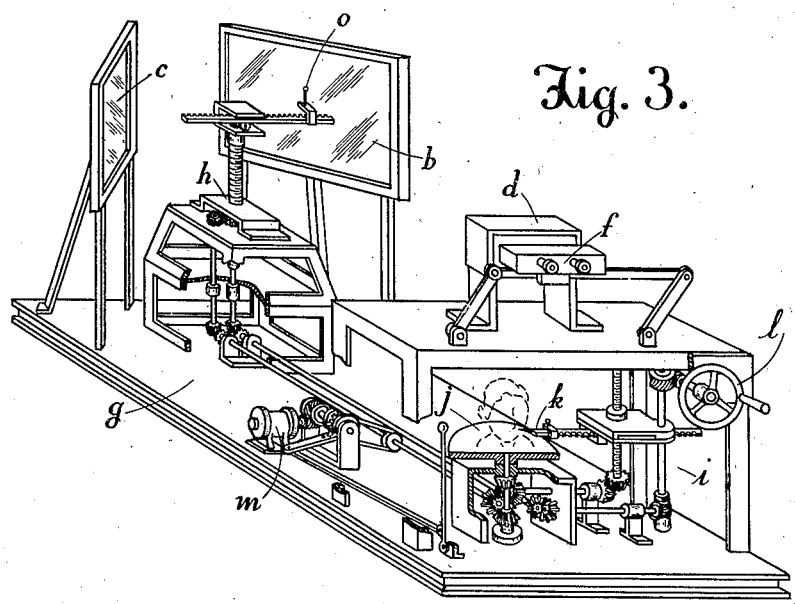
Fig. 3 is a perspective view of one form of the apparatus used herein, certain parts being broken away.

The following is a detailed explanation of this means, reference to be had to the accompanying drawings.

If as shown in Fig. 1 two mirrors $b$ and $c$ are disposed to the sides and somewhat rearwardly of an object $a$ and a photograph is taken by a stereoscopic camera $d$, it will be possible to obtain a plate having front direct images $a_1, a_2$ and the indirect images $b_1, b_2$ and $c_1, c_2$ reflected from the mirrors, on its left and right sides respectively as shown in Fig. 1a. Next, obtain a transparency $e$ printed from said plate, fit it into the position formerly occupied by the plate in the camera $d$, maintaining its original position and observe it with a binocular stereoscope $f$ situated behind it, and then the left and right images on the above transparency $e$ will be joined together to form three apparently solid virtual images $a_3, b_3, c_3$, as shown in Figure 2a. Further, as each device maintains its original position, said apparently solid virtual images appear as though the original solid object were still in the position from which it has now been removed. Therefore, if an indicator or mark point be located in the space formerly occupied by the object to be reproduced, images of the indicator will be received by the transparency in the camera and the indicator may be located accurately at any desired point on the surface of the apparently solid virtual image by observing the images of the indicator through the binocular stereoscope. Accordingly, if a sculpture is made by moving the point $o$ over the apparent surface of the image and transmitting this movement of the point $o$ to a sculpturing device, it will be possible to obtain a statue exactly the same in appearance as the virtual image. According to this method not only can a sculpture corresponding to the forward part of the object be produced but the sides and back of the object may also be reproduced in the sculpture by observing the images of the indicator point reflected into the camera from the mirrors. Thus an exact reproduction of the object may be sculptured.

To explain the manner of these movements fully with reference to Fig. 2a, when the real mark point $o$ is moved to occupy a point previously coincident with a point on the object to be reproduced, for instance, a point on the cheek of a person whose bust is to be sculptured, the images of this point will appear, when observed through the stereoscope, as though at $o$ in the front view $a_3$ and at $o_1$ and $o_2$ on the side views $b_3$ and $c_3$ as reflected from the mirrors. Therefore, what the operator of the apparatus has to do is only to observe the image of the indicator point on an image of the object, through the stereoscope and shift the point in a certain direction according to the apparent position of the surface of the image of the object. The image of the point of the indicator may be caused to travel on the apparent surface of the image of the object, as seen through the stereoscope, to pass apparently entirely around the object, for instance, if the mark point $o$ in the front image $a_3$ is observed and is shifted to the direction as indicated by an arrow along the surface of the image till it reaches the extreme edge $l$ of the image, it will be apparently positioned at $2$ in the image $b_3$, so that it is necessary only to transfer the stereoscope to the image on $b$ and shift the mark points so that $o_1$ may be moved on that image in the direction as indicated by an arrow. Further, when in this image the point $c_1$ reaches its extreme edge, transfer the stereoscope to the image $c_3$, cause the image $o_2$ to traverse the apparent surface of the image $c_3$, shift the stereoscope to again observe the image $a_3$ and cause the image of the indicator point to traverse the apparent surface of this image $a_3$ back to the starting point. By this operation the point has apparently moved entirely around the outer periphery of one horizontal section of the image of the object. Accordingly, if this movement is made in a helix of small pitch up and down the image, the mark point may apparently be moved to cover the entire apparent surface of the stereoscopic image of a statue. Since the movement of the image of the indicator point is produced by a corresponding movement of the indicator point itself, the apparent movement of the image of the point over the surface of the apparent solid image of the object is accompanied by a real movement of the indicator point itself over the surface of the space originally occupied by the object to be reproduced. It will presently be observed that the operator controls the indicator point and that this indicator is mechanically connected to a sculpturing or graving tool in such manner that the movement of the latter is correlated to the movement of the former.

Figure 4:
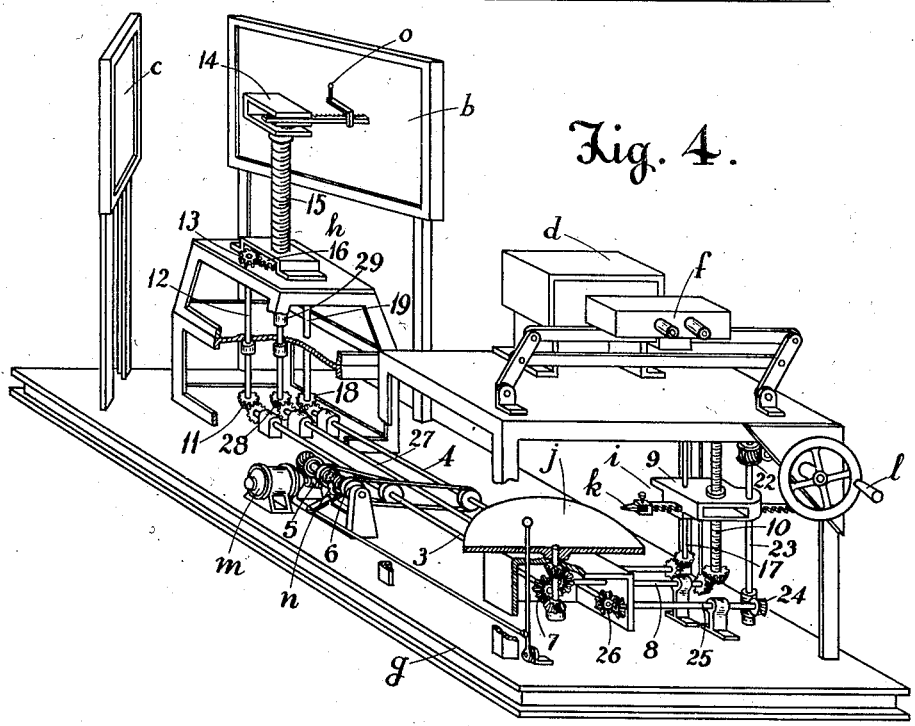
Fig. 4 is a view similar to Fig. 3 but showing a second form of the apparatus.

Figure 3 shows an example of a simple apparatus for carrying this method into practice. $d$ is a camera, and $b$ and $c$ are the mirrors both fixed to a base $g$. $h$ is a device adapted for shifting the mark point $o$; and $i$ a sculpturing device associated with it. The point $o$ is rotated in unison with a clay table $j$ forming part of the sculpturing device, and in the same direction, by an electric motor $m$. The point $o$ also is moved up and down at slow speed together with a carving knife $k$ forming a part of the sculpturing device. $f$ is a binocular stereoscope disposed close to the back face of the camera $d$ in such a manner that it can move freely in parallel with the latter. $l$ is a handle with which the observer moves the point $o$ radially with respect to the center of its rotation and this movement is transmitted by suitable means to the carving knife. In the above device, the photographing of an object is performed after removing the upper portion of the mark point shifting device and placing the object so that its center is positioned substantially in the center of the rotation of the mark point, and the device is returned to the original position as shown in the drawings, immediately after the photograph is taken. The embodiment shown in Figure 4 is a device which by utilizing this method carries out continuously two kinds of spiral and vertical sculpturing movements, so that a very correct sculpture may be made by meshy tracing. $3$ and $4$ are rotatable shafts to be rotated selectively by an electric motor $m$ by engaging a clutch $n$ with one of the transmitting gears $5$ or $6$. The shaft $3$ is so designed that it rotates not only the base $j$ of the clay table at the sculpturing part $i$ through a bevel gear $7$, but also a vertical screw rod $10$ adapted for moving up and down the supporting frame $9$ of the carving knife $k$, by means of a short shaft $8$, while the other end of said shaft $3$ rotates a vertical rod $12$ at the mark point moving device $h$ through a bevel gear $11$ and then rotates by a gear $13$ at the end of said rod $12$ a gear $16$ which is engaged with a vertical screw tube $15$ adapted for rotating the supporting frame $14$ of the mark point $o$.

The shaft $4$ rotates not only a vertical rod $17$ extending through the said carving knife supporting frame $9$ of the sculpturing device $i$ through the gearing, but also at the mark point moving device $h$ at the other end, a vertical rod $19$ supported in parallel with the vertical screw tube $15$, through a bevel gear $18$, so that by the gear $20$ of said vertical rod $19$ a gear $21$ (Fig. 5) adapted for moving up and down the screw tube $15$ is turned. A hand wheel $l$ for moving the mark point $o$ and the carving knife $k$ rectilinearly in a horizontal direction rotates a vertical rotatable shaft $23$, which extends through the carving knife supporting frame $9$, through a worm mechanism $22$, a short shaft $25$ through a worm mechanism $24$ at the lower end of said shaft $23$, a shaft $27$ through the bevel gear $26$ of said short shaft $25$, and a tubular shaft $29$ fitted in the screw tube $15$ through a bevel gear $28$ at the end of said shaft $27$.

As to the mark point moving device, when the gear $13$ is turned as shown in Figure 5, the gear $16$ meshing with it rotates the screw tube $15$ synchronously by the engagement of a spline groove $30$ extending along the tube $15$ by a key carried by the gear, so that the mark point supporting frame $14$ will be rotated as it supports the mark point $o$, and as on this occasion the gear $20$ and accordingly the gear $21$ is kept motionless, the screw tube $15$ is moved up or down, thereby moving the mark point spirally. Next, when the gear $13$ is kept motionless and the gear $20$ is turned, the tube $15$ is not rotated, but is moved only up or down by the gear $21$.

The movement of the mark point $o$ in and out of the center of the vertical rotating shaft is made by rotating a shaft $31$ fitted in the tubular shaft $29$ in such a manner as to be slidable up and down freely and also to be rotated synchronously with and through said tubular shaft 29 by the rotation of the hand wheel *l*, and having its upper end supported by the frame 14, and by transmitting the rotation of said shaft 31 by a suitable mechanism, for instance, a bevel gear 32, to a gear 33 meshing with a mark point supporting rack 34 supported by the frame 14 in such a manner as to be freely slidable horizontally. Figure 6 is a sculpturing device *i* associated with the above mark point moving device and is screwed along the rod 10 when the vertical rod 17 remains motionless and the rod 10 is rotated (when the mark point makes spiral movement), and is kept motionless as the gear 35 supported by the frame 9 remains meshed with the gear 36 of the rod 17, so that the frame 9 is moved either up or down with the rotation of the screw rod. On this occasion, the base *j* of the clay table being rotated in association with the mark point at the mark point device *h*, an object upon it receives rotative movement. Next, when the screw rod 10 is kept motionless and the rod 17 is rotated (when the mark point is moved up and down), the rod 17 will rotate the gear 35 meshing with a toothed wheel fitted to it in such a manner as to rotate and move vertically through the key and spline groove connection, whereby the frame 9 is moved up and down. The carving knife *k* fitted slidably to the frame 9 is moved in and out by the rack 39 meshing with the gear 38 of the shaft 23 which is rotated in association with the radial movement of the mark point *o*. In the above device, when a sculpture is to be made by moving the mark point and carving knife up and down by the rotation of the shaft 4, the normal and reverse movements are made alternately by changing the switch of the electric motor *m* at every change of the direction and the same time the base *j* and mark point *o* are moved through certain angle.

According to this method, it is possible to make a sculpture without the addition of any hand or finishing work, by the observer simply moving the image of the indicator point along the apparent surfaces of the three images in turn, and as an object may be photographed in the ordinary way, it is possible to sculpture also the instantaneous condition of a moving body.

In the device disclosed herein, the stereoscopic image of the indicator point is caused to traverse in the spiral path of the apparent surface of the stereoscopic image of the object to be reproduced. Also, although the virtual images must be life size, a sculpture may be made in any suitable size by changing the ratio of the gearing connecting the indicator movements and the sculpturing tool movements.

I claim:

1. The method of reproducing objects plastically which consists in locating the object to be reproduced at a fixed station, exposing a sensitized plate to take a stereoscopic photograph of the object from a fixed camera to produce a negative photograph, producing a transparent positive print from said negative, positioning the print in the place in the camera occupied by the plate when taking the photograph, substituting a universally movable indicator point for said object whereby stereoscopic images of the point are produced on the print, observing the print through a stereoscope to produce apparently solid virtual images of the object and point at the fixed station, moving the point to cause the image thereof to traverse the apparent surface of the virtual stereoscopic image, and thereby actuating a sculpturing tool to move through a lump of clay along a path corresponding to that traversed by the said point.

2. In apparatus for plastically reproducing solid objects, an object station, an arm adapted to be positioned transverse to the vertical axis of said station, an indicator point carried by one end of said arm, means to rotate the arm about said axis and to move it vertically along the axis, manually operable means to move said arm radially of said axis, a revoluble clay supporting table, gearing connecting the table with the means rotating said arm, a sculpturing tool extending above said table and mounted to move vertically and radially with respect to said table, gearing connecting the means for moving said arm vertically with the tool and moving the latter vertically in unison with the arm, and other gearing connecting the tool with said manually operable means and moving the tool radially in unison with the radial movement of the pointer.

3. In apparatus for plastically reproducing solid objects, an object station, an arm adapted to be positioned transverse to the vertical axis of said station, an indicator point carried by one end of said arm, means to rotate the arm about said axis and to move it vertically along the axis, manually operable means to move said arm radially of said axis, a revoluble clay supporting table, gearing connecting the table with the means rotating said arm, a sculpturing tool extending above said table and mounted to move vertically and radially with respect to said table, gearing connecting the means for moving said arm vertically with the tool and moving the latter vertically in unison with the arm, other gearing connecting the tool with said manually operable means and moving the tool radially in unison with the radial movement of the pointer, and a motor drive for the means to rotate the arm and move it vertically.

4. In apparatus for plastically reproducing solid objects, an object station, an arm adapted to be positioned transverse to the vertical axis of said station, an indicator point carried by one end of said arm, means to rotate the arm about said axis and to move it vertically along the axis, manually operable means to move said arm radially of said axis, a revoluble clay supporting table, gearing connecting the table with the means rotating said arm, a sculpturing tool extending above said table and mounted to move vertically and radially with respect to said table, gearing connecting the means for moving said arm vertically with the tool and moving the latter vertically in unison with the arm, other gearing connecting the tool with said manually operable means and moving the tool radially in unison with the radial movement of the indicator point, a motor drive for the means to rotate the arm and move it vertically, and a manually operable clutch for connecting and disconnecting the motor drive from the means driven thereby.

5. In apparatus for plastically reproducing solid objects, an object station, an arm adapted to be positioned transverse to the vertical axis of said station, an indicator point carried by one end of said arm, means to rotate the arm about said axis and to move it vertically along the axis, manually operable means to move said arm radially of said axis, a revoluble clay supporting table, gearing connecting the table with the means rotating said arm, a sculpturing tool extending above said table and mounted to move vertically and radially with respect to said table, gearing connecting the means for moving said arm vertically with the tool and moving the latter vertically in unison with the arm, other gearing connecting the tool with said manually operable means and moving the tool radially in unison with the radial movement of the pointer, and a motor drive for the means to rotate the arm and move it vertically, said motor drive including reversing gearing controlling the vertical direction of movement of the arm, and clutch means controlling said reversing gearing to cause vertical movement of the arm selectively up and down.

6. In apparatus for plastically reproducing solid objects, an object station, an arm adapted to be positioned transverse to the vertical axis of said station, an indicator point carried by one end of said arm, means to rotate the arm about said axis and to move it vertically along the axis, manually operable means to move said arm radially of said axis, a revoluble clay supporting table, gearing connecting the table with the means rotating said arm, a sculpturing tool extending above said table and mounted to move vertically and radially with respect to said table, gearing connecting the means for moving said arm vertically with the tool and moving the latter vertically in unison with the arm, and other gearing connecting the tool with said manually operable means and moving the tool radially in unison with the radial movement of the pointer; in combination with photo-stereoscopic means producing an apparently solid virtual image of the object to be reproduced and a similar image of the indicator point with the images in cooperative relation whereby movement of the arm produces a corresponding movement of the image of the point.

7. In apparatus for plastically reproducing solid objects, an object station, an arm adapted to be positioned transverse to the vertical axis of said station, an indicator point carried by one end of said arm, means to rotate the arm about said axis and to move it vertically along the axis, manually operable means to move said arm radially of said axis, a revoluble clay supporting table, gearing connecting the table with the means rotating said arm, a sculpturing tool extending above said table and mounted to move vertically and radially with respect to said table, gearing connecting the means for moving said arm vertically with the tool and moving the latter vertically in unison with the arm, other gearing connecting the tool with said manually operable means and moving the tool radially in unison with the radial movement of the pointer, and a motor drive for the means to rotate the arm and move it vertically; in combination with photo-stereoscopic means producing an apparently solid virtual image of the object to be reproduced and a similar image of the indicator point with the images in cooperative relation whereby movement of the arm produces a corresponding movement of the image of the point.

8. In apparatus for plastically reproducing solid objects, an object station, an arm adapted to be positioned transverse to the vertical axis of said station, an indicator point carried by one end of said arm, means to rotate the arm about said axis and to move it vertically along the axis, manually operable means to move said arm radially of said axis, a revoluble clay supporting table, gearing connecting the table with the means rotating said arm, a sculpturing tool extending above said table and mounted to move vertically and radially with respect to said table, gearing connecting the means for moving said arm vertically with the tool and moving the latter vertically in unison with the arm, other gearing connecting the tool with said manually operable means and moving the tool radially in unison with the radial movement of the pointer, a motor drive for the means to rotate the arm and move it vertically, and a manually operable clutch for connecting and disconnecting the motor drive from the means driven thereby; in combination with photo-stereoscopic means producing an apparently solid virtual image of the object to be reproduced and a similar image of the indicator point with the images in cooperative relation whereby movement of the arm produces a corresponding movement of the image of the point.

9. In apparatus for plastically reproducing solid objects, an object station, an arm adapted to be positioned transverse to the vertical axis of said station, an indicator point carried by one end of said arm, means to rotate the arm about said axis and to move it vertically along the axis, manually operable means to move said arm radially of said axis, a revoluble clay supporting table, gearing connecting the table with the means rotating said arm, a sculpturing tool extending above said table and mounted to move vertically and radially with respect to said table, gearing connecting the means for moving said arm vertically with the tool and moving the latter vertically in unison with the arm, other gearing connecting the tool with said manually operable means and moving the tool radially in unison with the radial movement of the pointer, a motor drive for the means to rotate the arm and move it vertically, said motor drive including reversing gearing controlling the vertical direction of movement of the arm, and clutch means controlling said reversing gearing to cause vertical movement of the arm selectively up and down; in combination with photo-stereoscopic means producing an apparently solid virtual image of the object to be reproduced and a similar image of the indicator point with the images in cooperative relation whereby movement of the arm produces a corresponding movement of the image of the point.

TAKASHI TOMOZAWA.